(12) United States Patent
Song et al.

(10) Patent No.: US 7,563,338 B2
(45) Date of Patent: Jul. 21, 2009

(54) METHOD FOR ATTACHING A NONMETAL COVER LAYER TO A WORKPIECE, A MOLD USED IN THE METHOD AND A PRODUCT PRODUCED WITH THE METHOD

(75) Inventors: Hai-Min Song, Shenzhen (CN); Shih-Ming Liu, Tu-Cheng (TW); Wei Zou, Shenzhen (CN); Wen-Che Chen, Tu-Cheng (TW); Hsin-Pei Chang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 623 days.

(21) Appl. No.: 11/143,843

(22) Filed: Jun. 2, 2005

(65) Prior Publication Data

US 2006/0068160 A1 Mar. 30, 2006

(30) Foreign Application Priority Data

Sep. 25, 2004 (CN) .................. 2004 1 0051721

(51) Int. Cl.
*B32B 37/00* (2006.01)
(52) U.S. Cl. .................. 156/245; 156/212; 156/216; 156/285
(58) Field of Classification Search .......... 156/212, 156/216, 245, 285
See application file for complete search history.

(56) References Cited

U.S. PATENT DOCUMENTS

| | | | | |
|---|---|---|---|---|
| 2,955,972 A | * | 10/1960 | Wintermute et al. | .......... 156/79 |
| 4,737,226 A | * | 4/1988 | Inoue | .......... 156/245 |
| 5,108,529 A | * | 4/1992 | Shuert | .......... 156/214 |
| 5,486,252 A | * | 1/1996 | Wong | .......... 156/212 |
| D430,155 S | | 8/2000 | Cronk | |
| 6,327,142 B1 | | 12/2001 | Cronk | |
| 6,426,130 B2 | * | 7/2002 | Jones et al. | .......... 428/41.8 |
| 2002/0079611 A1 | * | 6/2002 | Ellison et al. | .......... 264/247 |
| 2003/0083094 A1 | | 5/2003 | Hsu et al. | |

FOREIGN PATENT DOCUMENTS

| | | |
|---|---|---|
| JP | 3-281227 | 12/1991 |
| JP | 7-96087 | 4/1995 |

(Continued)

OTHER PUBLICATIONS

Machine translation of JP 08-224813 1996.*

*Primary Examiner*—John L Goff

(57) ABSTRACT

A method to produce a product includes the steps of: providing a mold including an upper mold (40) and a lower mold (30), the upper mold defining a plurality of through holes; providing a workpiece (10), a hot melt adhesive (25), and a cover layer (50) between the upper and lower molds, the hot melt adhesive arranged between the workpiece and the cover layer; providing a heater (20) to melt the hot melt adhesive; closing the mold; conducting high-pressure gas into the mold via the through holes to press the cover layer toward the workpiece; and opening the mold to pick up the product having the workpiece and the cover layer attached thereto by means of the adhesive.

16 Claims, 5 Drawing Sheets

FOREIGN PATENT DOCUMENTS

| | | | |
|---|---|---|---|
| JP | 08224813 A * | 9/1996 | |
| TW | 58287 | 5/1984 | |
| TW | 447729 | 7/2001 | |
| TW | 527279 | 4/2003 | |
| TW | 568003 | 12/2003 | |
| TW | 593519 | 6/2004 | |

* cited by examiner

METHOD FOR ATTACHING A NONMETAL COVER LAYER TO A WORKPIECE, A MOLD USED IN THE METHOD AND A PRODUCT PRODUCED WITH THE METHOD

Relevant subject matter is disclosed in a co-pending U.S. Patent application with application Ser. No. 11/143,832, filed Jun. 2, 2005, entitled "METHOD FOR ATTACHING A NONMETAL COVER LAYER TO A METAL PIECE, A MOLD USED IN THE METHOD AND A PRODUCT PRODUCED WITH THE METHOD", assigned to the same assignee as this application.

BACKGROUND OF THE INVENTION

1. Field of the Invention

The present invention relates to a method for attaching a nonmetal cover layer to a workpiece, a mold used in the method and a product produced with the method.

2. General Background

Portable computers, such as laptop computers and notebook computers, have become increasingly popular for general use. Manufacturers are striving to design varieties of portable computers to please users.

As Taiwan Patent No. 447729 teaches a portable computer which has a leather cover layer attached to an enclosure thereof via screws. However, the cover layer is liable to peel off due to missing of the screws. Moreover, the cover layer can not be smoothly and tightly attached to the enclosure of the portable computer by using screws, wrinkles may be formed on the cover layer, such that the appearance of the enclosure is less pleasing.

U.S. Pat. No. 6,775,130 teaches another type of portable computer. A leather grain layer is disposed on an exterior facing side of a top housing portion of the portable computer. However, the leather grains of the leather grain layer are liable to wear off, and the leather grains can not exhibit impressive appearance.

What is desired, therefore, is a product including a cover layer which has improved duration of life and pleasing appearance. What is also needed is a method to produce the product.

SUMMARY

In one preferred embodiment, a product includes a workpiece, a hot melt adhesive heated to adhere to the workpiece, and a nonmetal cover layer covering the workpiece and adheringly sandwiching the adhesive in cooperation with the workpiece.

In another preferred embodiment, a method to produce a product, includes the steps of: providing a mold including an upper mold and a lower mold, the upper mold defining a plurality of through holes; providing a workpiece, a hot melt adhesive, and a cover layer between the upper and lower molds, the hot melt adhesive arranged between the workpiece and the cover layer; providing a heater to melt the hot melt adhesive; closing the mold; conducting high-pressure gas into the mold via the through holes to press the cover layer to the workpiece; and opening the mold to pick up the product having the workpiece and the cover layer attached thereto by means of the adhesive.

In still another preferred embodiment, a mold for attaching a cover layer to a workpiece is provided. The mold includes an upper mold defining a cavity, and a lower mold in cooperation with the upper mold. A plurality of through holes is defined in the upper mold at the cavity for conducting high pressure gas therethrough to press the cover layer to the workpiece. A retention bracket is provided to retaining the cover layer in the cavity of the upper mold. The lower mold is for supporting the workpiece thereon.

Other advantages and novel features will become more apparent from the following detailed description of preferred embodiments when taken in conjunction with the accompanying drawings, in which:

DETAILED DESCRIPTION OF THE EMBODIMENTS

In a preferred embodiment of the invention, a product, which includes a workpiece 10 and a nonmetal cover layer 50 attached to the workpiece 10, is produced with a molding method in which a mold is used. The workpiece 10 may be, for example, a part of an electronic device enclosure.

Figure 1:
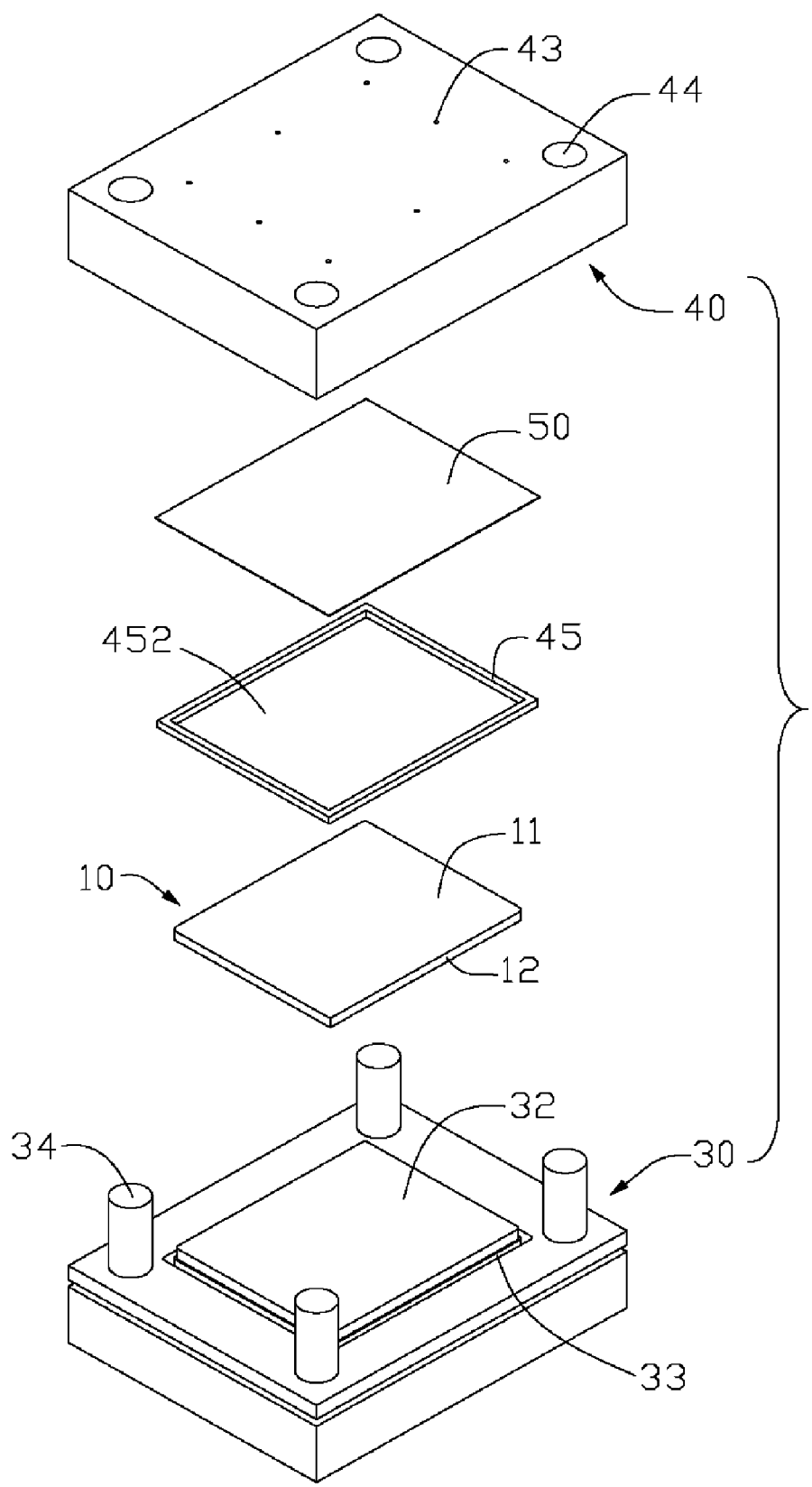
FIG. 1 is an exploded, isometric view of a mold, a workpiece and a cover layer in accordance with a preferred embodiment of the present invention.

Referring to FIG. 1, the workpiece 10 includes a rectangle top panel 11, and four lateral panels 12 depending from four edges of the top panel 11 respectively. The workpiece 10 is made from metal material or plastic material. The metal material includes, for example, magnesium alloy, aluminum alloy, and zinc alloy. The plastic material includes, for example, polycarbonate, acrylonitrile-butadiene-styrene copolymer, high impact polystyrene, polymethyl methacrylate, polyvinyl chloride, polyolefin, modified polyphenylene oxide, polyester, polyamide, polyacetal, ionomer, polyurethane, and a mixture thereof. The plastic material can also includes additives, such as, for example, glass fabric, carbon fabric, mica, talcum powder, and clay. In the preferred embodiment, magnesium alloy piece is selected to illustrate the invention.

The mold includes an upper mold 40 and a lower mold 30 in cooperation with the upper mold 40. A central supporting member 32 protrudes beyond a top surface of the lower mold 30, a surrounding groove 33 is thereby defined in the lower mold 30 adjacent the supporting member 32. The supporting member 32 is shaped for insertion into a space of the workpiece 10 defined by the top panel 11 and the lateral panels 12 thereof. Four guide posts 34 protrude perpendicularly from four corners of the top surface of the lower mold 30 respectively.

Figure 2:
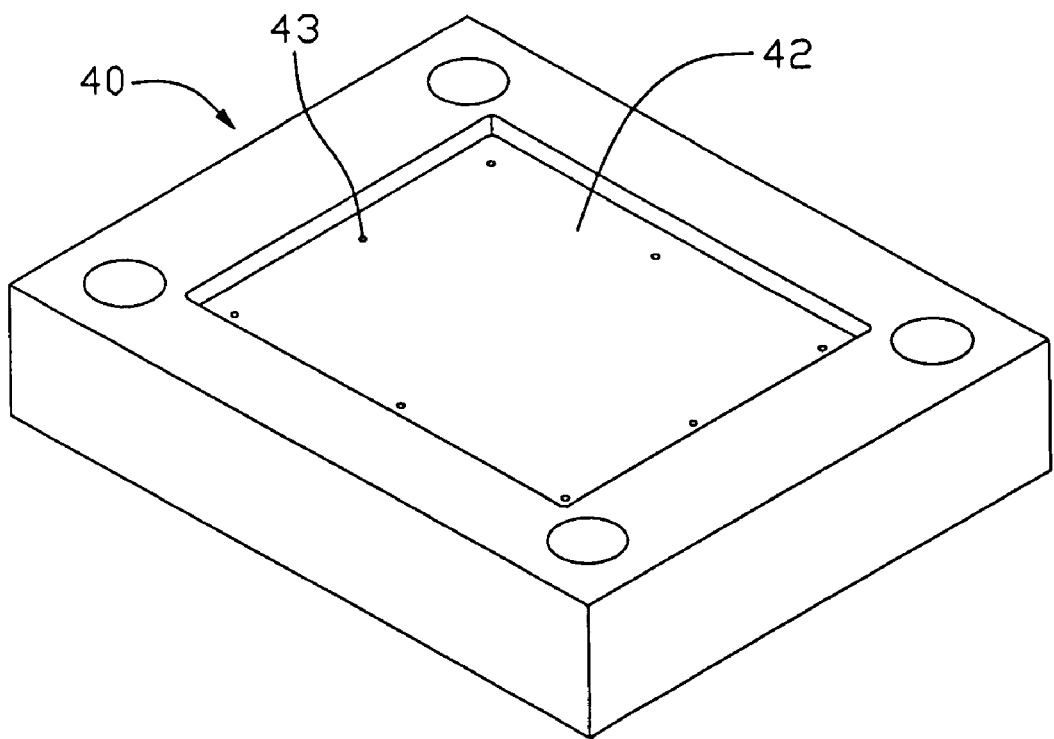
FIG. 2 is an isometric view of an upper mold of the mold of FIG. 1, but viewed from another aspect.
Figure 3:
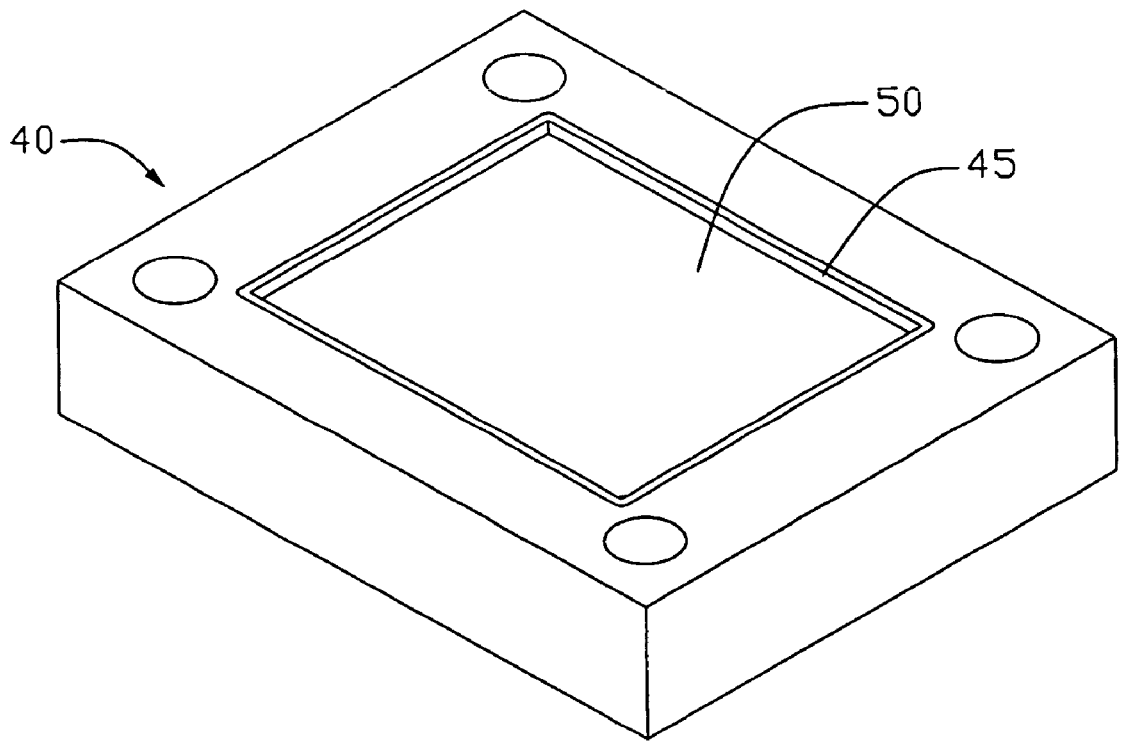
FIG. 3 is similar to FIG. 2, showing a retention bracket attaches the cover layer to the upper mold.

Referring particularly to FIGS. 2 and 3, the upper mold 40 defines a cavity 42 in a bottom surface thereof. A plurality of through holes 43 is defined in the upper mold 40 and communicates with the cavity 42. Four guide apertures 44 are defined at four corners of the upper mold 40, corresponding to the guide posts 34 of the lower mold 30. A retention bracket 45 is provided to engage in the cavity 42 by magnetism. The retention bracket 45 is made from magnetic material, and the upper mold 40 is made from steel. The retention bracket 45 is a frame defining a through opening 452 therethrough.

The cover layer 50, in the preferred embodiment, is an one-piece leather layer. The cover layer 50 can also be, for examples, cloth layer and other material layer formed of natural or synthetic fibers.

To attach the cover layer 50 to the workpiece 10, a piece of plate-shaped hot melt adhesive 25 (see FIG. 7), which can be, for example, alkene copolymer, styrene copolymer, acryl, polyurethane, polyamide, polyester, and a copolymer of at least two materials selected from the group consisting of alkene copolymer, styrene copolymer, acryl, polyurethane, polyamide and polyester, is applied to an undersurface of the cover layer 50.

Figure 4:
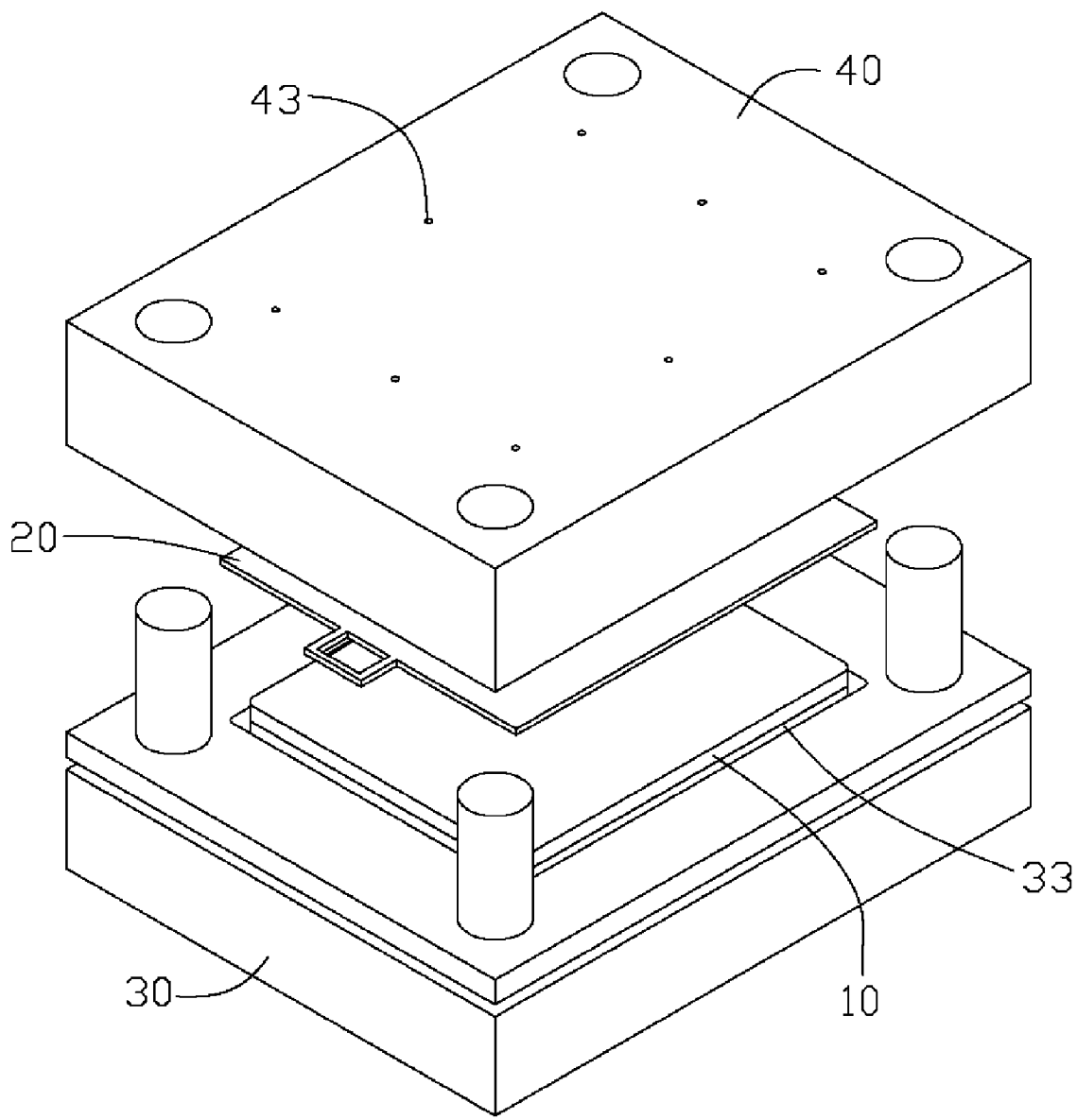
FIG. 4 is similar to FIG. 1, showing the workpiece is disposed on a lower mold of the mold of FIG. 1.

Referring to FIG. 4, the workpiece 10 is placed on the supporting member 32 of the lower mold 30, and the supporting member 32 is generally received in the workpiece 12. Edge portions of the cover layer 50 is clamped between the upper mold 40 and the retention bracket 45 at the cavity 42 of the upper mold 40, with the undersurface of the cover layer 50 facing the workpiece 10.

A heater 20 is then placed under the upper mold 40 to heat the cover layer 50 until the hot melt adhesive 25 is melt. The heater 20 is thereafter withdrawn from under the upper mold 40.

Figure 5:
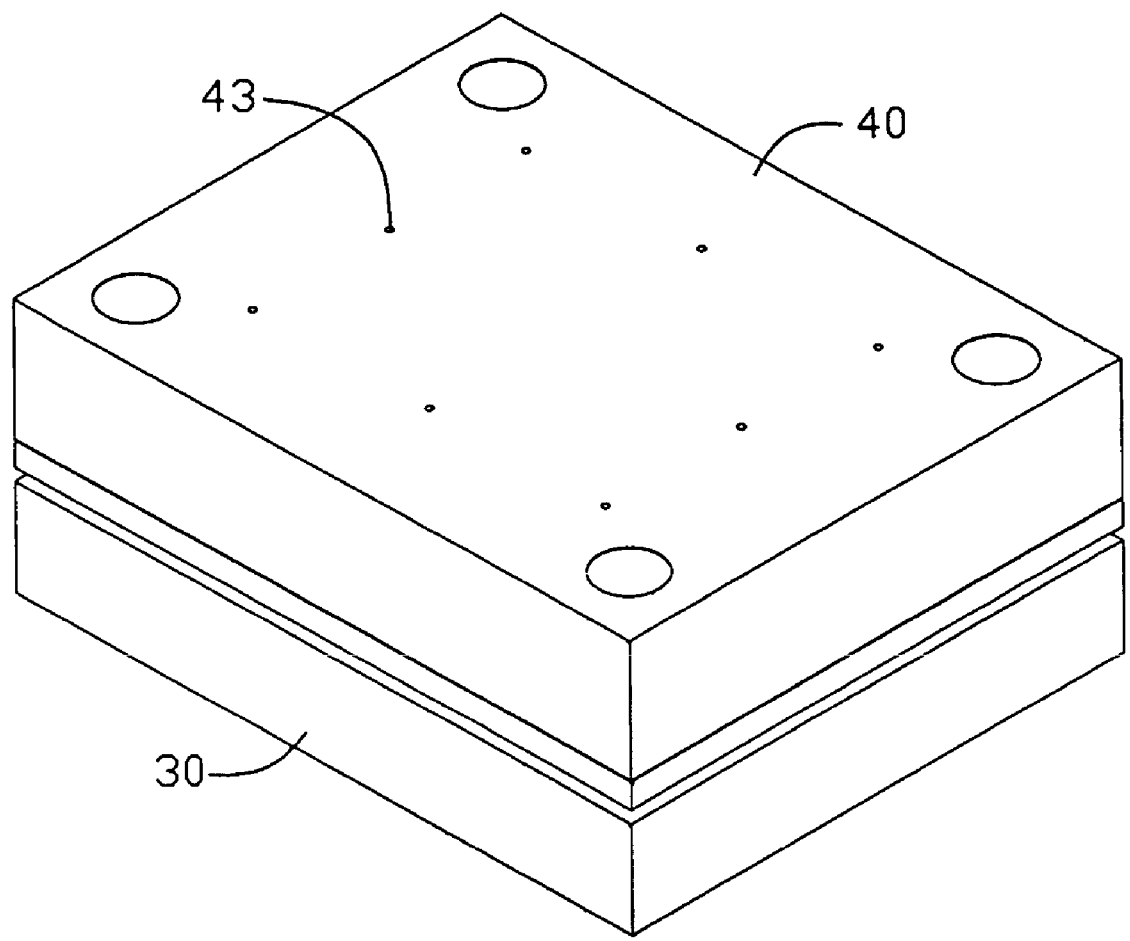
FIG. 5 is similar to FIG. 4, showing the mold is closed.

The upper mold 40 is moved toward the lower mold 30 to close the mold, with the guide posts 34 of the lower mold 30 relatively sliding in corresponding apertures 44 of the upper mold 40. FIG. 5 shows the upper mold 40 engages the lower mold 30. The supporting member 32 together with the workpiece 10 is accommodated in the cavity 42 of the upper mold 40 and the through opening 452 of the retention bracket 45. High-pressure gas is conducted in the cavity 42 of the upper mold 40 via the through holes 43. High-pressure gas blows and presses the cover layer 50 to the workpiece 10, the edge portions of the cover layer 50 is disengaged from the retention bracket 45, the cover layer 50 passes through the through opening 452 of the retention bracket 45 to be evenly and tightly applied to the top panel 11 of the workpiece 10, and the edge portions of the cover layer 50 are blew to bend downward and tightly enclose the lateral panels 12 of the workpiece 10. The cover layer 50 thus tightly adheres to the top panel 11 and the lateral panels 12 of the workpiece 10 by means of the melted hot melt adhesive 25. The upper mold 40 is separated from the lower mold 30, and the workpiece 10 having the cover layer 50 attached thereto is picked up.

In aforesaid embodiment, the cover layer 50 can also be supported with a plurality of springy pins, which protrudes beyond the workpiece 10 from the lower mold 30, instead of the retention member 45. When the mold is closed the springy pins is driven to retract into the lower mold 30, and the cover layer 50 contacts the workpiece 10.

In alternative embodiment, when the workpiece 10 is metal, a conventional heating system (not visible) is selectively embedded in the mold, for heating the upper and lower molds 40, 30 to a predetermined temperature. The cavity 42 of the upper mold 40 is heated to a temperature ranged from 60 to 200 degrees centigrade, the supporting member 32 is heated to a temperature ranged from 60 to 200 degrees centigrade, and the temperature of at least one of the upper and lower molds 40, 30 is beyond melting point of the hot melt adhesive 25 but never too high to damage the cover layer 50.

The workpiece 10 is placed on the supporting member 32 of the lower mold 30, the cover layer 50 with the hot melt adhesive 25 attached thereunder is placed on the workpiece 10, or the hot melt adhesive 25 is placed on the workpiece 10 instead of being pre-attached to the undersurface of the cover layer 50, the cover layer 50 is then placed on the hot melt adhesive 25, the mold is finally closed. The hot meld adhesive 25 is melted by heat conducted from the mold to combine the cover layer 50 and the workpiece 10.

Figure 6:
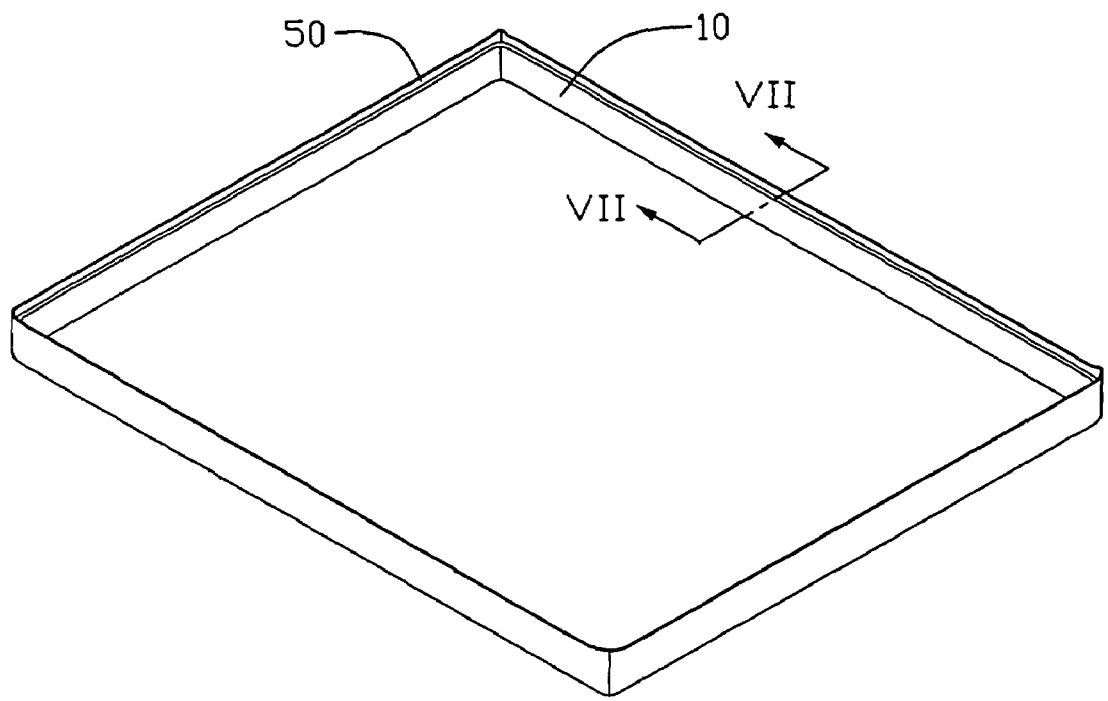
FIG. 6 is an isometric view of a product including the workpiece and the cover layer of FIG. 1.
Figure 7:
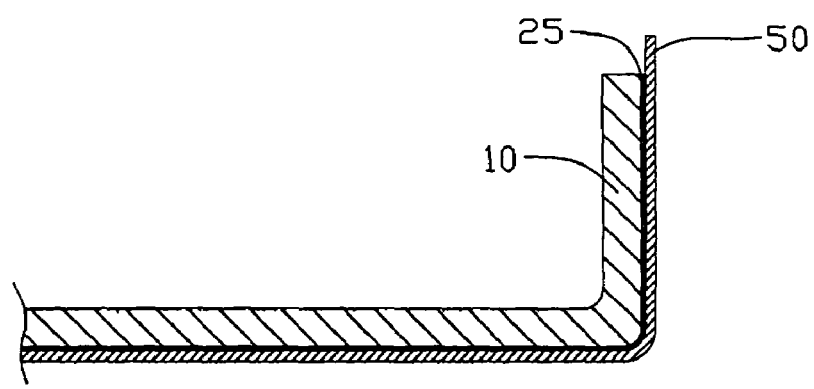
FIG. 7 is a cross-sectional view of part of the product of FIG. 6, taken along line VII-VII thereof.

Referring to FIGS. 6 and 7, the product produced with aforesaid molding method includes the workpiece 10, the hot melt adhesive 25 and the cover layer 50 adhering to the workpiece 10 by the hot melt adhesive 25.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A method to manufacture a decorated workpiece, comprising:

providing a mold defining a cavity therein, and capable of containing the workpiece and a retention bracket within the cavity;

placing a decorative layer in the cavity by engagement of the mold and the retention bracket;

applying adhesive to one of the decorative layer and the workpiece;

treating the adhesive to be ready for adhering of the decorative layer onto the workpiece;

uniformly pressing the decorative layer to the workpiece; and removing the mold from the workpiece having the decorative layer adhering thereon so as to acquire the decorated workpiece;

wherein the retention bracket is a frame used to temporarily attach edge portions of the decorative layer to an inner surface of the cavity of the mold before the adhesive-applying step, and the edge portions of the decorative layer are disengaged from the retention bracket when the decorative layer is pressed to the workpiece.

2. The method as claimed in claim 1, wherein the adhesive is hot melt adhesive, and a heater is placed closely to the adhesive for treating the adhesive in the treating step.

3. The method as claimed in claim 2, wherein the adhesive is alkene copolymer, styrene copolymer, acryl, polyurethane, polyamide, polyester, or a copolymer of at least two materials selected from the group consisting of alkene copolymer, styrene copolymer, acryl, polyurethane, polyamide and polyester.

4. The method as claimed in claim 1, wherein the decorative layer is a one-piece leather layer or cloth layer.

5. The method as claimed in claim 1, wherein the retention bracket is made from magnetic material, which is attachable to the inner surface of the cavity of the mold by magnetism.

6. The method as claimed in claim 1, wherein the mold comprises an upper mold defining the cavity, a plurality of through holes defined in the upper mold at the cavity for conducting high pressure gas therethrough uniformly pressing the decorative layer to the workpiece.

7. The method as claimed in claim 6, wherein the mold further comprises a lower mold for supporting the workpiece in cooperation with the upper mold.

8. The method as claimed in claim 7, wherein the lower mold comprises a supporting member being received in the cavity of the upper mold, and the supporting member is for supporting the workpiece.

9. The method as claimed in claim 8, wherein the supporting member protrudes beyond a top surface of the lower mold, a surrounding groove is defined in the lower mold adjacent the supporting member, for receiving a bent portion of the workpiece.

10. The method as claimed in claim 1, wherein the workpiece is magnesium alloy piece, aluminum alloy piece, or zinc alloy piece.

11. The method as claimed in claim 1, wherein the workpiece is plastic material of polycarbonate, acrylonitrile-butadiene-styrene copolymer, high impact polystyrene, polymethyl methacrylate, polyvinyl chloride, polyolefin, modified polyphenylene oxide, polyester, polyamide, polyacetal, ionomer, polyurethane, or a mixture thereof.

12. A method to manufacture a decorated workpiece, comprising:

providing a mold comprising an upper mold and a lower mold, the upper mold defining a cavity, a supporting member protruding from the lower mold and supporting the workpiece;

placing a decorative layer and a retention bracket in the cavity, the decorative layer being attached in the cavity by engagement of the retention bracket and an inner surface of the cavity;

applying adhesive between the decorative layer and the workpiece;

heating the adhesive;

closing the mold, whereby the workpiece is received in the cavity;

conducting high pressure gas into the cavity to allow the high pressure gas to press the decorative layer to the workpiece, whereby the decorative layer is uniformly adhered onto the workpiece; and removing the mold to acquire the decorated workpiece having the decorative layer adhering thereonto.

13. The method as claimed in claim 12, wherein the retention bracket is a frame for pressing edge portions of the decorative layer, the frame has a through opening receiving the workpiece in the step of the closing the mold.

14. The method as claimed in claim 13, wherein a plurality of through holes is defined in the upper mold at the cavity for conducting the high pressure gas into the cavity, and the decorative layer is disengaged from the retention bracket and passes through the through opening of the frame in the step of the conducting the high pressure gas into the cavity.

15. The method as claimed in claim 14, wherein the retention bracket is made from magnetic material and the upper mold is made from steel, and the retention bracket is attached to the inner surface of the cavity of the upper mold by magnetism.

16. The method as claimed in claim 12, wherein providing a heater for heating the adhesive in the heating step.

* * * * *